United States Patent
Plyler

(12)
(10) Patent No.: US 6,290,113 B1
(45) Date of Patent: Sep. 18, 2001

(54) LADDER RACK LOCKDOWN

(76) Inventor: John Austin Plyler, 829 Woodburn Rd., Raleigh, NC (US) 27605

( * ) Notice: Subject to any disclaimer, the term of this patent is extended or adjusted under 35 U.S.C. 154(b) by 0 days.

(21) Appl. No.: 09/522,241

(22) Filed: Mar. 9, 2000

(51) Int. Cl.[7] .................................................. B60R 9/00
(52) U.S. Cl. ........................ 224/315; 224/569; 224/570; 70/14; 70/19; 182/127
(58) Field of Search .................................. 224/310, 315, 224/569, 570; 220/210; 70/14, 19; 182/106, 127, 214

(56) References Cited

U.S. PATENT DOCUMENTS

| | | | |
|---|---|---|---|
| 3,672,612 | * | 6/1972 | Laing, Jr. .......................... 248/361 R |
| 3,888,398 | * | 6/1975 | Payne ................... 224/42.1 |
| 4,008,838 | * | 2/1977 | Correll ................ 224/42.1 |
| 4,618,083 | * | 10/1986 | Weger, Jr. ............... 224/324 |
| 4,827,742 | * | 5/1989 | McDonald ............... 70/19 |
| 5,009,350 | * | 4/1991 | Schill et al. ........................ 224/324 |
| 5,058,791 | * | 10/1991 | Henriquez et al. ................... 224/310 |
| 5,154,258 | * | 10/1992 | Krukow ............................... 182/127 |
| 5,186,588 | * | 2/1993 | Sutton et al. ........................ 410/120 |
| 5,411,196 | * | 5/1995 | Lee, Jr. et al. ........................ 224/321 |
| 5,918,488 | * | 7/1999 | Deeter ..................................... 70/14 |

* cited by examiner

*Primary Examiner*—Stephen K. Cronin

(57) ABSTRACT

A hinged device that is attached to an existing roof rack, which keeps ladders locked in place without any movement in any direction. It can be attached to the existing roof rack by either pop rivets, screws or welding. Once the lockdown device is attached to the existing rack, it is hinged over the ladder rungs as well as over the bottom cross bar of the roof rack supporting the ladder, and then locked in place with a long shackled padlock. Any existing roof rack will work if the sides of the rack are as high as the top of the ladder it supports so that the hinge will fold over the ladder. The rack lockdown is made to only secure one ladder and not multiple stacks of ladders. This devise allows two ladders to be secured, one to either side of an existing roof rack. What makes this device unique, with only one moving part, is the ease in securing a ladder to a vehicle rack.

1 Claim, 1 Drawing Sheet

LADDER RACK LOCKDOWN

BACKGROUND OF THE INVENTION

Many racks have been developed to carry ladders. The first racks merely secured the ladder with rope or rubber shock cords which were slow to fasten, often offering little support, and allowed the ladder to be easily stolen. Mechanical racks came out that either had many expensive parts that were costly to purchase, clumsy to operate, or too difficult to figure out. This invention solves all of the above; being easy to install to an existing roof rack, easy to operate, and secures the ladder from thief.

SUMMARY OF THE INVENTION

The present invention provides a ladder rack lockdown device for van-type vehicles. With this simple unique device, a ladder can be secured to a roof rack quickly and easily. First the hinged fork is lifted. The ladder is slid under the lockdown. Then the hinged fork is lowered down over the ladder with the fork going over one rung of the ladder and past the supporting bar of the rack. Last a long shacked padlock is secured through the holes in the fork.

DETAILED DESCRIPTION

Figure 1:
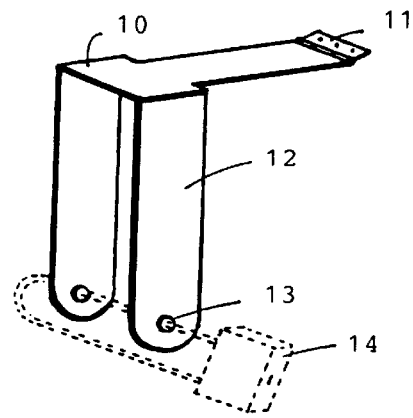
FIG. 1 is pictorial view of the ladder rack lockdown with the outline of a long shacked padlock engaged through the forks of the lock.
Figure 2:
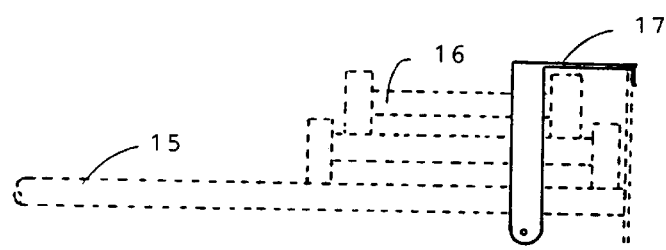
FIG. 2 is a fragmented cross sectional outline view of a roof rack showing a side view of the ladder rack lockdown.
Figure 3:
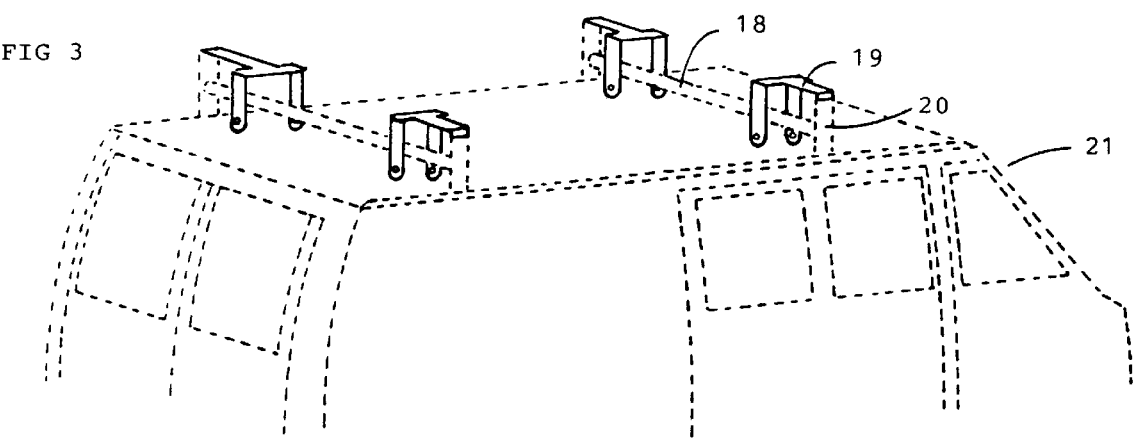
FIG. 3 is a perspective view showing how four ladder rack lockdowns would be placed on the existing racks of the fragmented outline of a van.

In the accompanying drawings, schematically depicted, like characters of reference designate like parts in those figures of the drawings in which they occur. The top T-bar 10 and fork arms 12 are fabricated from mild steel. The top of the T-bar 10 is connected to a common cabinet hinge 11. The forked arms 12 of the rack have holes 13 drilled through the lower end of the two forks to facilitate a long shacked padlock 14. The five parts of the rack, including the hinge are welded together as illustrated in FIG. 1. The fragmented cross sectional outline view of a roof rack 15 is supporting a cross sectional view of a ladder 16. The ladder 16 is held in place by the ladder rack lockdowns 17 as illustrated in FIG. 2. The existing roof rack 18 comprising of longitudinally-spaced transversely-extending, parallel crossbars are shown with a ladder rack lockdown 19 and vertically extending plates 20, mounted on the fragmented outline of a van 21, as illustrated in FIG. 3.

What is claimed is:

1. A ladder rack lockdown for securing a ladder to a roof rack of a vehicle, the roof rack having a pair of longitudinally-spaced transversely-extending, parallel crossbars, each of the crossbars having a pair of vertically extending plates attached to and longitudinally-spaced along the crossbar, said ladder rack lockdown comprising, four locking members, each of the locking member comprising a T-shaped T-bar, a hinge attached to one end of the T-bar, and a pair of fork arms attached to an opposite end of and extending perpendicularly to the T-bar, said fork arms having holes at a free end thereof, each of said locking members being attached to each one of the vertically extending plates by said hinge, wherein, when a ladder is placed on the crossbars of the roof rack, a rung of the ladder adjacent each of the crossbars is surrounded by one of the corresponding locking members, the fork arms of the locking member extend on opposite sides of the rung and the cross-bar with the holes of the fork arms extending below the crossbar, the ladder being secured to the crossbar by inserting the shackle of a pad lock through the holes of the fork arms.

* * * * *